April 21, 1964     R. W. HALBERG ETAL     3,129,602
AUTOMATIC TWO SPEED TRANSMISSION
Filed Dec. 22, 1960
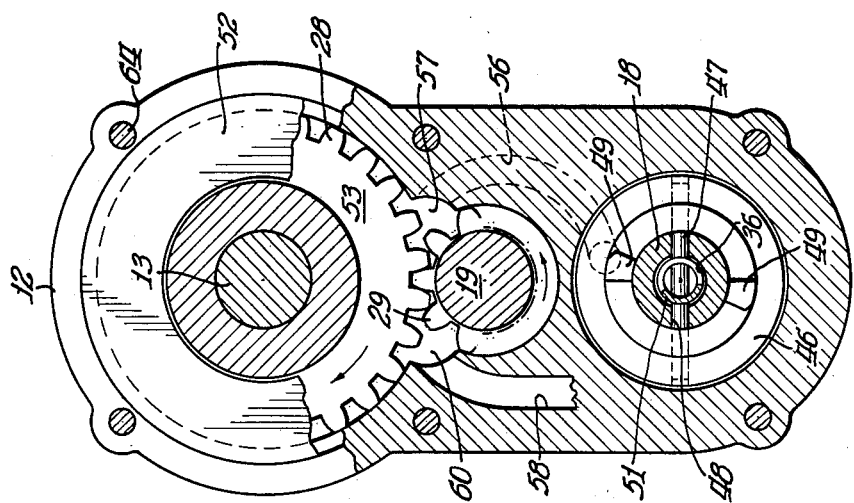
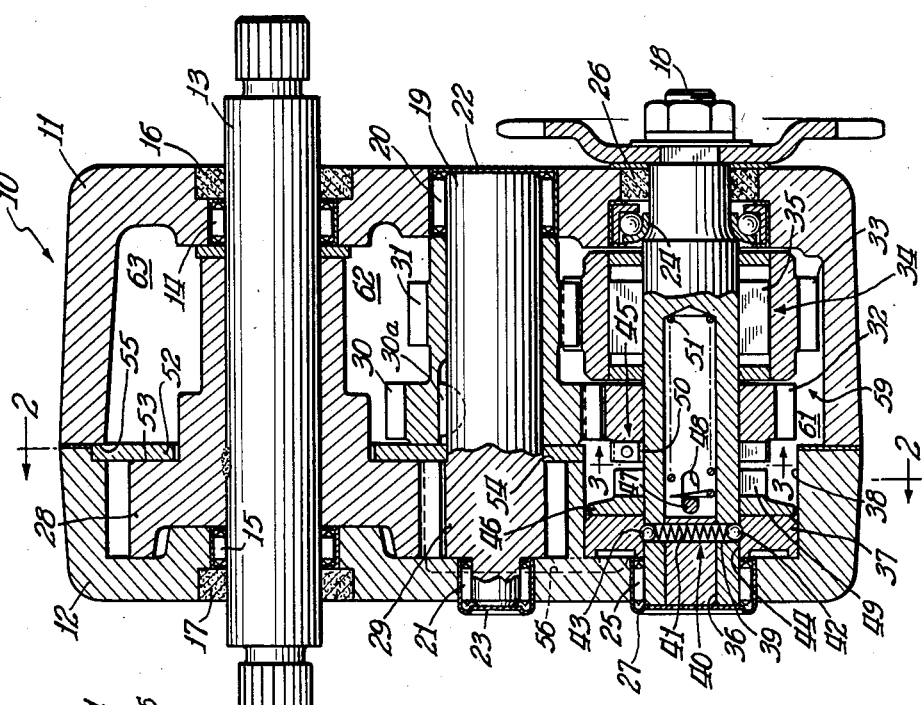
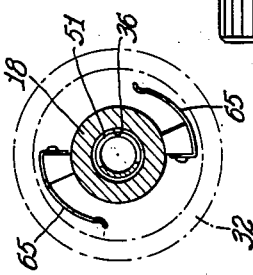
Inventors:
Robert W. Halberg and
Milton R. Nielsen
By: F. A. Krusemark
Atty.

United States Patent Office 3,129,602
Patented Apr. 21, 1964

3,129,602
AUTOMATIC TWO SPEED TRANSMISSION
Robert W. Halberg, Des Plaines, and Milton R. Nielsen, Glen Ellyn, Ill., assignors to Borg-Warner Corporation, Chicago, Ill., a corporation of Illinois
Filed Dec. 22, 1960, Ser. No. 77,709
7 Claims. (Cl. 74—368)

This invention relates to a transmission mechanism and more particularly to an automatic lightweight, two speed transmission.

The subject device affords a distinct improvement over those mechanisms representative of the prior art, since, due to its novel construction which comprises a gear train, which in addition to its normal function also comprises a hydraulic pump which actuates an engaging device to complete a high speed power train thereby affording an automatic means of shifting from a low speed gear train to a high speed gear train. This automatic shifting occurs in response to a predetermined input shaft speed.

The additional function of the gear train, namely, that of also serving as a hydraulic pump, provides an inexpensive, efficient and distinctly advantageous means of actuating a lightweight, two speed transmission mechanism. The entire mechanism is relatively simple in construction and therefore reduces possible malfunction to a minimum and simplifies the replacement of parts in the event of breakage due to accident or long use.

A transmission made according to this invention is particularly adaptable for use in velocipedes or similar devices where an automatic gear shifting is desired. Centrifugal governors have been used in mechanisms of this type to serve as a means to cause shifting to a higher output. However, since the speeds are low in a device of this type, this particular means would call for an unusually large centrifugal governor which is not desirable in a small mechanism. Applicants' device comprising hydraulic pump means as heretofore stated and detents which hold the transmission in the first gear ratio until hydraulic pressure is built up to unseat the means held by the detent which thereby provides the same function as that provided by a centrifugal governor but in a simplified and more practical manner.

An object of the present invention is to provide a simple two speed transmission mechanism capable of shifting from a low speed power train to a higher speed power train in response to a speed-up of an input shaft.

An object of the present invention is to provide an automatic two speed transmission wherein a power train also serves as a hydraulic pump that provides a power source to cause shifting to a higher speed.

Another object of this invention is to provide a gear pump which will act as a combination pressure source and gear train in a transmission mechanism.

This invention consists of the novel constructions, arrangements and devices to be hereinafter described and claimed for carrying out the above stated objects and such other objects as will be apparent from the following description of a preferred embodiment of the invention, illustrated with respect to the accompanying drawings, wherein:

FIG. 1 is a longitudinal sectional view of a transmission embodying the principles of this invention;

FIG. 2 is a sectional view taken on line 2—2 of FIG. 1 in the direction indicated; and FIG. 3 is a view in the direction indicated showing a pair of blockers fixed to a pair of teeth integral with a gear face.

Like characters of reference designate like parts in the several views.

Referring now to the drawings and particularly to FIG. 1, the illustrated transmission may be seen to comprise a housing 10 separable into two portions 11 and 12, a drive shaft 13 extends through the housing 10 and is provided with bearings 14 and 15 having seals 16 and 17, respectively, which serve to prevent fluid loss. A driven shaft 18 and a countershaft 19 are also provided. The countershaft 19 is supported by bearings 20 and 21 which are provided with end caps 22 and 23, respectively, which serve to prevent fluid loss. The driven shaft 18 is supported by bearings 24 and 25 which are provided with seals 26 and 27, respectively which also serve to prevent fluid loss.

The drive shaft 13 carries a combination drive and pump gear 28 which meshes with a combination driven pump gear 29 mounted on the countershaft 19. A relatively large gear 30 and a relatively small gear 31 are connected together and fastened to the countershaft 19 by a key 30a, and mesh with a relatively small gear 32 and a relatively large gear 33 respectively, which are carried by the driven shaft 18. The relatively small gear 32 is rotatably free with respect to the driven shaft 18 and the relatively large gear 33 is provided with a one-way clutch 34 having tiltable sprags 35 effective between the driven shaft 18 and the relatively large gear 33. The driven shaft 18 is provided with a bore 36 and a piston 37 slidably mounted thereon and operable in a cylinder bore 38 in the housing portion 12. The driven shaft 18 is provided with a cross bore 39 for receiving components of a detent 40 which comprise a spring 41 biased between a pair of oppositely disposed balls 42 that are operably associated with an annular recess 43 in an inner periphery 44 of the piston 37. A jaw clutch 45 is disposed between the relatively small gear 32 and the piston 37 and comprises a main portion 46 slideably mounted on the driven shaft 18 but held against rotation thereon by a pin 47 longitudinally slideable within a pair of longitudinal slots 48 int he driven shaft 18; the slots 48 being oppositely disposed with respect to bore 36. The main portion 46 is provided with a first pair of diametrically opposite teeth 49 operably associated with a second pair of diametrically opposite teeth 50 that are integral with the relatively small gear 32 as more clearly shown in FIGS. 2 and 3. A spring 51 carried within the bore 36 is biased against the pin 47 to thereby urge disengagement between the first pair of teeth 49 and the second pair of teeth 50. Disengagement of the teeth places the transmission in low gear as hereinafter more fully explained. A plate 52 is disposed between the faces 53 and 54 of the gears 28 and 29, respectively, and the inner face 55 of the housing portion 11. Referring now to FIG. 2, an outlet conduit 56 is shown which is effective to carry fluid under pressure from chamber 57 against piston 37 in the cylinder bore 38 to thereby urge engagement between the first pair of teeth 49 and the second pair of teeth 50. An intake conduit 58 is connected with respect to a sump 59 for supplying fluid to an intake chamber 60. The sump 59 comprises interconnected fluid chambers 61, 62, and 63. The portion 12 of the housing 10 is provided with a number of holes 64 and the portion 11 of the housing 10 is also provided with matching holes, not shown for use in bolting the two portions 11 and 12 together to complete the housing 10. A pair of blockers 65 are attached to the outer ends of the second pair of teeth 50 as shown in FIG. 3. These blockers 61 are made of flat spring material of a width substantially that of the depth of the teeth; are arcuately curved inwardly and provided with turned up ends. The purpose of these blockers 65 is to prevent partial engagement between the first pair of teeth 49 and the second pair of teeth 50. Since the blockers 65 curve inwardly, the first pair of teeth 49 can not drop into position for engagement with the second pair of teeth 50 unless they are rotated adjacent the free area between the ends of the blockers 65 and the teeth 50 because they will be riding on the sides of the blockers 65 until they pass the area between the ends of the blockers 61 and the teeth 50 to which the respective blockers are attached. After dropping into this free area, the first pair of teeth will raise the blockers 65 as they move into engagement with the second pair of teeth 50.

In operation, the transmission according to the present invention is normally in low speed. When power is applied to the drive shaft 13 in a clockwise direction, the countershaft 19 is rotated in a counterclockwise direction by means of the gear train comprising gears 28 and 29. The relatively large gear 30 and the relatively small gear 31 being connected to the countershaft 19 therefore also rotate in a counterclockwise rotation and being in meshing engagement with the relatively small gear 32 and the relatively large gear 33 respectively cause rotation of these gears in a clockwise rotation. The relatively small gear 32 being rotatably free with respect to the driven shaft 18 thereby permits rotation of the driven shaft 18 in a clockwise direction by virtue of the one-way clutch 34 between the driven shaft 18 and the relatively large gear 33. Since the relatively small gear 31 now serving as the driving gear with respect to the relatively large gear 33, the relative rotation of the driven shaft 18 is slower than the countershaft 19. When the speed of the gear train comprising gears 28 and 29 which also construct a hydraulic pump reaches a certain speed, fluid under pressure against the piston 37 overcomes the resistance of the detent 40 and the spring 51 thereby causing the pair of teeth 49 connected to the main portion 46 of the jaw clutch 45 to move into engagement with the pair of teeth 50 connected to the relatively small gear 32. The main portion 46 of the jaw clutch 45 being pinned to the driven shaft 18 against rotation by the pin 47 and by virtue of the interconnection to teeth 49 and 50, the relatively small gear 32 is thereby connected to the driven shaft 18 by the jaw clutch 45. The driven shaft 18 is thereby driven by the gear train comprising the relatively large gear 30 as the driving gear and the relatively small gear 32 as the driven gear which now being connected to the driven shaft 18 causes relatively faster rotation of the driven shaft 18 than the one driven when the relatively large gear 33 is driven by the relatively small gear 31 thereby providing a second speed. It is apparent that at this stage the relatively large gear 33 is now free to rotate with respect to the driven shaft 18 because the shaft 18 exceeds the speed of the relatively large gear 33 thereby causing the one-way clutch 34 inoperative to overrun.

When speed of the drive shaft is reduced sufficiently to drop the fluid pressure provided by the hydaulic pump (comprising the gears 28 and 29), the bias of spring 51 overcomes the fluid pressure against the piston 37 thereby moving the main portion 46 of the jaw clutch 45 so as to disengage the pair of teeth 49 from the pair of teeth 50 which returns the transmission to first speed.

We wish it to be understood that our invention is not to be limited to the specific constructions and arrangements shown and described except only insofar as the appended claims may be so limited, as it will be apparent to those skilled in the art that changes may be made without departing from the principles of the invention.

We claim:

1. In a transmission, the combination of a driving element, a driven element, means affording a low speed power train between said elements, means affording a high speed power train between said elements, said last named means including a pair of meshed gears disposed in a chamber portion thereby forming a fluid pump and a fluid pressure actuated engaging device for rendering the high speed power train effective, the said pump being effective to supply fluid pressure to said engaging device whereby said high speed power train is made effective at a predetermined speed.

2. In a transmission, the combination of a driving element, a driven element, means affording a low speed power train between said elements, said means including a one-way engaging device, means affording a high speed power train between said elements which, when effective, causes said one-way device to overrun, a fluid pressure actuated engaging device for rendering said high speed power train effective, and a pump mechanism comprising a pair of meshed gears disposed in a chamber the said pair of gears being a part of said high power train operated by said driving element thereby providing a fluid pressure which increases with the speed of said driving element, said pump mechanism being in fluid communication with said engaging device to actuate said engaging device when said driving element reaches a predetermined speed.

3. In a transmission, the combination of a drive element, a driven element, means affording a low speed power train between said elements, means affording a high speed power train between said elements, said last named means including a pair of meshed gears disposed in a chamber portion and forming a fluid pump the pressure output of which increases with the speed of the said drive element, a fluid pressure actuated engaging device for rendering said high speed power train effective, said engaging device in fluid communication with said pump whereby said pressure output of said pump actuates said engaging device and completes said high speed power train as the speed of said driving element increases.

4. In a transmission, the combination of a drive shaft, a driven shaft, a countershaft, means affording a low speed power train between said shafts, said means including a one-way engaging device, means affording a high speed power train between said shafts, each of said power trains including gears on each of said shafts, a pair of said gears on said countershaft and said drive shaft being in mesh and being disposed in a chamber portion to constitute a fluid pump the pressure output of which increases with the speed of said drive shaft, and a fluid pressure actuated engaging device in fluid communication with said pump to be engaged to complete said high speed power train when said drive shaft reaches a predetermined speed.

5. In a transmission the combination of a drive shaft, a driven shaft, a countershaft, means affording a low speed power trains between said shafts, said means including a one-way engaging device, means affording a high speed power train between said shafts, each of said power trains including gears on each of said shafts, a pair of said gears on said drive shaft and on said countershaft being in mesh and being disposed in a casing to constitute a fluid pump the pressure output of which increases with the speed of said drive shaft, a fluid pressure actuated engaging device in communication with said pump to engage said high speed power train and allow a consequent overrunning of said one-way engaging device when said drive shaft reaches a predetermined speed.

6. In a transmission the combination of a drive shaft, a driven shaft, a countershaft, means affording a low speed power train between said shafts, means affording a high speed power train between said shafts, each of said power trains including gears on each of said shafts, said gears on said driven shaft being rotatably mounted thereon, said gears on the said drive shaft being in mesh with said gears on the said counter-shaft and being disposed within a chamber to constitute a fluid pump, the pressure output of which increases with the speed of the said drive shaft, a fluid pressure actuated engaging device disposed on said driven shaft, and a fluid conduit affording communication between said fluid pump and said fluid pressure actuated engaging device to engage said gears rotatably mounted on said driven shaft to complete the high speed power train when said drive shaft reaches a predetermined speed.

7. In a transmission, the combination of a drive shaft, a driven shaft, a countershaft means providing a low speed power train between said shifts, said means including a one-way engaging device, means providing a high speed power train between said shafts, each of said power trains including gears on each of said shafts, a pair of said gears on said drive shaft and on said countershaft being in mesh and being disposed in a casing portion to constitute a fluid pump the pressure output of which increases with the speed of said drive shaft, a relatively small gear rotatably mounted on said driven shaft, a fluid pressure actuated engaging device disposed on said driven shaft in fluid communication with said pump so as to engage said small gear upon axial movement thereof occasioned by said fluid pressure, passing to said engaging device to complete said high speed power train, and a detent to restrain said engaging device in its non-engaged position until said fluid pressure builds up to force said engaging device past said detent and into engagement with said small gear when said drive shaft reaches a predetermined speed.

References Cited in the file of this patent

UNITED STATES PATENTS

| | | |
|---|---|---|
| 1,783,513 | Maurer | Dec. 2, 1930 |
| 2,181,118 | Burner | Nov. 28, 1939 |
| 2,333,680 | Schneider et al. | Nov. 9, 1943 |
| 2,573,472 | Martin | Oct. 30, 1951 |
| 2,600,269 | Saives | June 10, 1952 |